Feb. 27, 1968   D. SCARAMUCCI   3,370,825
STRESSED BALL VALVE SEALS
Filed July 19, 1965   2 Sheets-Sheet 1

INVENTOR.
DOMER SCARAMUCCI
BY
Dunlap and Laney
ATTORNEYS

Feb. 27, 1968 D. SCARAMUCCI 3,370,825
STRESSED BALL VALVE SEALS
Filed July 19, 1965 2 Sheets-Sheet 2

INVENTOR.
DOMER SCARAMUCCI
BY
Dunlap and Laney
ATTORNEYS

United States Patent Office 3,370,825
Patented Feb. 27, 1968

3,370,825
STRESSED BALL VALVE SEALS
Domer Scaramucci, 3245 S. Hattie,
Oklahoma City, Okla. 73129
Filed July 19, 1965, Ser. No. 473,244
6 Claims. (Cl. 251—148)

This invention relates generally to improvements in ball valves, and more particularly, but not by way of limitation, to improved seals for ball valves.

As it is well known in the art, ball valves are provided with seals or seats, normally at both the upstream and downstream ends of the valve, to prevent leakage around the valve ball when the valve ball is in a closed position. Such seals have taken various forms and compositions, but are normally formed of an elastic material, such as rubber, a rubber compound, or a synthetic resin material.

One of the most serious problems with ball valve seals is to provide a seal which operates effectively in both high pressure and low pressure service. Rubber and rubber compound seals are normally too elastic to withstand high pressures unless they are reinforced by metal rings and the like, and the use of metal rings in the seals requires rather expensive manufacting techniques. Synthetic resin seals, on the other hand, have historically been used for high pressure service and normally are not considered to have the required elasticity to form low pressure seals. It may also be noted that, in the past, when synthetic resin types of seals have been mechanically wedged between the valve ball and body in order to form low pressure seals, the valve ball is difficult to turn to open and closed positions, and when both upstream and downstream seals of this type are used, the valve is subject to excessive pressure build-up in the body between the seals—providing a dangerous condition in many fields of use.

The present invention contemplates a novel ball valve construction utilizing synthetic resin seals wherein each seal is effectively clamped in place between the valve body and a connector at the respective end of the valve body and extends radially inward into sealing engagement with the valve ball. The seal is provided with what may be considered an excess of material in the clamping portion thereof, whereby the action of clamping the seal in place in the valve biases the inner peripheral portion of the seal against the valve ball to provide an effective low pressure seal and yet the valve ball is not materially restricted in its opening and closing movements. The present invention also contemplates a seal particularly suited for use in a ball valve wherein the seal will form both a high pressure and a low pressure seal when installed in a valve.

An object of the invention is to provide a ball valve construction suitable for use in either high or low pressure service.

Another object of this invention is to minimize the clearance requirements in the manufacture of ball valves and thus minimize the cost of manufacture of ball valves.

Another object of this invention is to provide a ball valve utilizing synthetic resin seals wherein the valve may be used in either high or low pressure service and yet the valve ball will not be materially restricted in its opening and closing movements.

A further object of this invention is to provide a ball valve construction having both upstream and downstream seals and yet wherein excessive body pressure will be bled upstream.

Another object of this invention is to provide a synthetic resin seal particularly suited for use in ball valves which may be used as either an upstream or a downstream seal.

A still further object of this invention is to provide a ball valve which is simple in construction, will have a long service life and yet which may be easily and economically repaired.

Other objects and advantages of the invention will be evident from the following detailed description when read in conjunction with the accompanying drawings which illustrate the invention.

Figure 1:
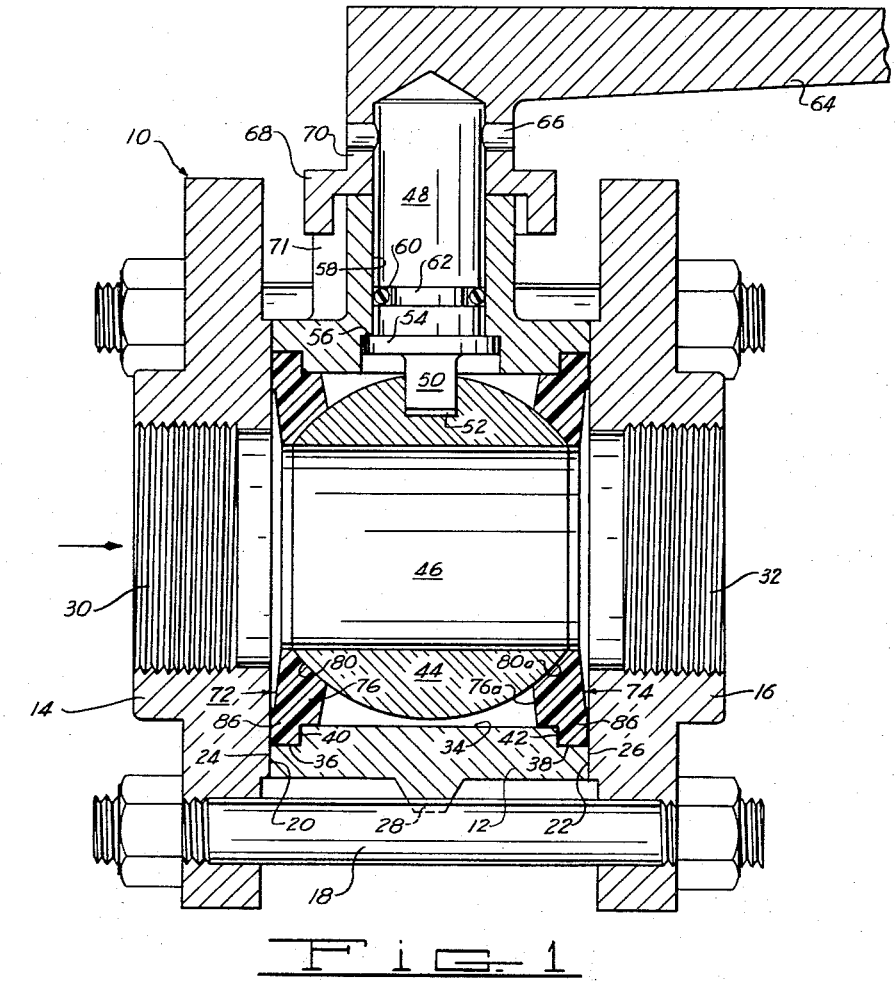
FIG. 1 is a vertical sectional view through a ball valve constructed in accordance with this invention.

Referring to the drawings in detail, and particularly FIG. 1, reference character 10 generally designates a ball valve which includes a body 12 and tubular connectors 14 and 16 secured to the opposite ends of the body 12 by a plurality of circumferentially spaced bolts 18. Both the upstream end 20 and downstream end 22 of the body 12 are formed substantially flat and are engaged by the flat inner faces 24 and 26 of the connectors 14 and 16, respectively. The bolts 18 may extend through grooves or slots 28 formed around the outer periphery of the body 12 to facilitate the centering of the connectors 14 and 16 with respect to the body. As will be observed in FIG. 1, the connectors 14 and 16 are in the form of standard pipe flanges having threaded bores 30 and 32 for connection with adjacent sections of a pipe line (not shown) and forming the inlet and outlet for the valve 10.

A bore 34 extends longitudinally through the valve body 12 to form a valve chamber, and counterbores 36 and 38 are formed in the upstream and downstream ends of the body 12 concentrically with respect to the bore or chamber 34 for purposes to be described. The diameters of the bore 34 and counterbores 36 and 38 are all greater than the diameters of the connector bores 30 and 32. It may also be noted at this point that the counterbore 36 provides a circumferential shoulder 40 in the upstream end of the valve chamber facing upstream, and the counterbore 38 provides a circumferential shoulder 42 in the downstream end of the valve chamber facing downstream. Further, the counterbores 36 and 38 provide cylindrical walls at the opposite ends of the valve chamber outwardly of the shoulders 40 and 42, respectively.

The usual valve ball 44, having a port 46 therethrough, is mounted in the valve chamber 34 for opening and closing the valve. The valve ball 44 is turned in its opening and closing movements by means of a valve stem 48 having its inner end 50 flattened and slidingly fitting in an elongated groove 52 formed in the outer periphery of the valve ball. The slot 52 is longer, in a transverse direction, than the valve stem end 50, whereby the ball 44 can move a limited distance downstream when the valve is closed, as will more fully hereafter be discussed. A circumferential shoulder 54 is formed around the valve stem 48 and mates with a flattened surface 56 in the valve body 12 to prevent the inadvertent removal of the valve stem. It will also be noted that the valve stem is extended through an aperture 58 in the top of the valve body and is sealed therein by a sealing ring 60 mounted in a mating groove 62 in the outer periphery of the valve stem. A handle 64 is secured to the outer end of the valve stem 48 by pins 66 or the like to provide for manual turning of the valve stem 48 and valve ball 44. Preferably, one or more lugs 68 are formed on the hub 70 of the handle 64 and arranged to mate with corresponding projections 71 on the valve body 12 to limit the turning movement of the handle 64 to approximately 90° in the usual manner.

An upstream sealing ring 72 is clamped between the connector 14 and the upstream end 20 of the valve body 12 in a position to encircle the inlet 30, and a downstream sealing ring 74 is clamped between the connector 16 and the downstream end 22 to encircle the outlet 32 of the valve.

Figures 2, 3:
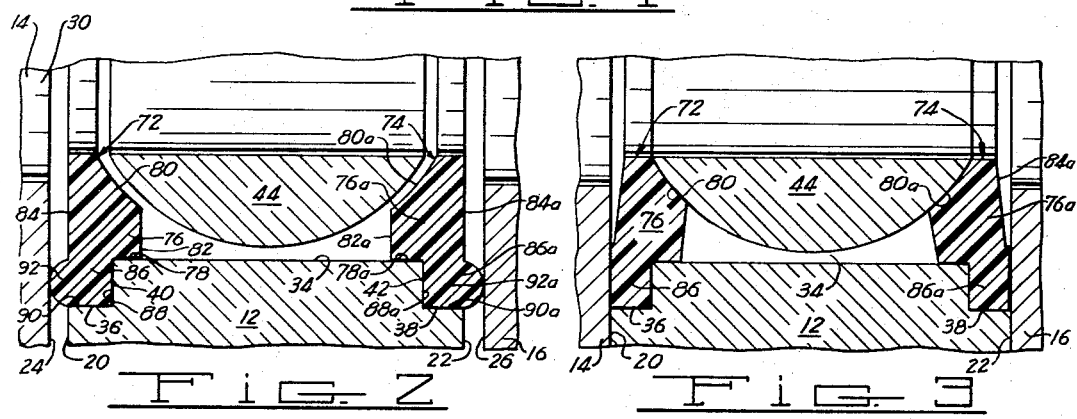
FIG. 2 is an enlarged exploded view of a portion of the valve construction shown in FIG. 1 illustrating the unstressed shape of the seals.
FIG. 3 is a view similar to FIG. 2 with the connectors secured to the opposite ends of the valve body and the seals in their stressed conditions.

As shown in its relaxed or unstressed condition in FIG. 2, the upstream sealing ring 72 comprises a ring or annular body 76 of a synthetic resin material, such as nylon, Teflon, or Delrin having an outer periphery 78 sized to slidingly fit in the bore or chamber 34 and having an inner diameter less than the inner diameter of the inlet 30. A ball-engaging surface 80 is formed on the body 76 between the inner end 82 thereof and the inner periphery thereof. In this form of the invention, the ball-engaging surface 80 is curved to conform to the curvature of the outer surface of the valve ball 44 and thus makes sealing engagement with the ball 44 throughout the length of the ball-engaging surface. The outer end 84 of body 76, in the relaxed condition of the body, is substantially flat from the inner periphery of the body to a point even with the outer periphery 78 of the body, and, when the body 76 is installed in the valve body 12, this outer end 84 is substantially coterminous with the upstream end 20 of the valve body.

A circumferential flange 86 is formed around the outer periphery 78 of the body 76 and extends into the counterbore 36. The inner end 88 of the flange 86 is substantially flat to mate with the shoulder 40 in the valve body 12 and the outer periphery 90 of the flange 86 is of a uniform diameter which, in the relaxed condition of the flange, substantially conforms to the diameter of the counterbore 36. An annular bead 92 is formed on the outer end of the flange 86, that is, the end of the flange opposite of end 88. The bead 92 is of a radial width substantially conforming to the radial width of the shoulder 40 and is directly opposed to the shoulder 40. It may also be noted that the outer periphery of the bead 92 is coterminous with the outer periphery 90 of the flange 86. Thus, when the connector 14 is bolted against the upstream end 20 of the valve body 12, the bead 92 is distorted, and since the flange 86 completely fills the counterbore 36, a volume of material equal to the bead 92 is displaced into the main body portion 76 of the sealing ring 72 to bias the ring 72 inwardly in the valve chamber 34 against the valve ball 44 as illustrated most clearly in FIG. 3. It will be noted in FIG. 2 that when the sealing ring 72 is first installed in the valve body 12 (before the connector 14 is bolted to the valve body) a small space is provided between the ball-engaging surface 80 of the sealing ring and the adjacent surface of the ball 44. But, when the connector 14 is bolted against the upstream end 20 of the valve body 12, the ball-engaging face 80 is moved inwardly and biased against the ball 44 to provide a seal against the outer surface of the ball.

The downstream sealing ring 74 is constructed in the same manner as the upstream sealing ring 72. For convenience, therefore, the portions of the sealing ring 74 conforming to the portions of the sealing ring 72 are given the same reference numerals with the suffix "a" added. It will therefore be apparent that before the connector 16 is bolted to the downstream end 22 of the valve body 12, the ball-engaging surface 80a of the downstream seating ring 74 will be spaced a small distance from the ball 44. When the connector 16 is bolted against the downstream body face 22, the inner peripheral portion 76a of the sealing ring 74 is flexed or biased inwardly in the valve chamber 34 to bring the ball-engaging face 80a into sealing engagement with the outer surface of the ball 44 as shown most clearly in FIG. 3.

With the valve ball 44 in an open position as shown in FIGS. 1 and 3, the ball will be centered in the valve chamber 34 and both of the sealing rings 72 and 74 will be in engagement with the adjacent surfaces of the ball. It willl then also be noted that since the flange 86 completely fills the counterbore 36 and is maintained under a state of compression by the connector 14, the sealing ring 72 will provide an effective seal between the connector 14 and the upstream end 20 of the valve body 12 to prevent leakage between these parts. Similarly, the flange 86a of the downstream sealing ring 76 provides an effective seal between the downstream end 22 of the valve body 12 and the connector 16.

Figure 4:
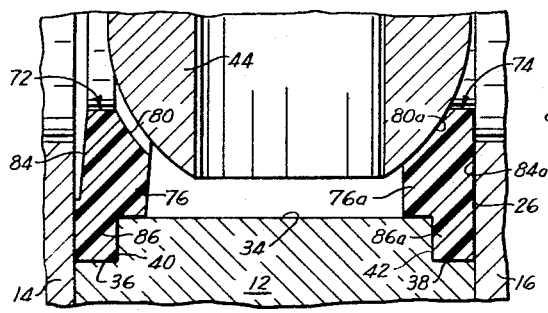
FIG. 4 is a view similar to FIG. 3 showing one type of action of the seals when the valve is closed.

When the valve ball 44 is turned to a closed position as shown, for example, in FIG. 4, and an appreciable pressure differential exists across the valve, the upstream pressure acting across the ball forces the ball downstream toward the connector 16. Thus, the ball 44 forces the main body portion 76a of the downstream sealing ring 74 downstream until the outer end 84a of the seal engages the inner end 26 of the connector 16. At this time, the ball-engaging surface 80a of the seal 74 will remain in sealing engagement with the adjacent surface of the ball 44, whereby the seal 74 provides an effective downstream seal.

Figure 5:
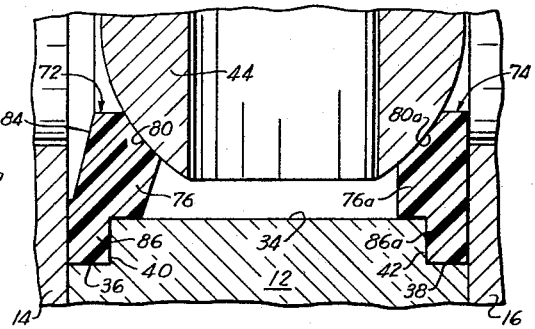
FIG. 5 is a view similar to FIG. 4 showing another type of sealing action when the valve is closed.

When the ball 44 is closed and forced downstream, the upstream pressure will also be acting on the outer end 84 of the upstream sealing ring 72, thereby also tending to move the main body portion 76 of the sealing ring 72 downstream with the ball. However, the ball-engaging face 80 may or may not remain in engagement with the ball 44, depending upon the relative size and flexibility of the sealing ring 72. If the body portion 76 is appreciably thick and/or stiff, and the downstream movement of the ball 44 is appreciable, the body portion 76 will be moved downstream in the valve chamber 34 a limited distance and the ball-engaging surface 80 will lose contact with the ball 44 as shown in FIG. 4. In this event, the upstream seal 72 is then not effective and the valve is provided only with the downstream seal 74. However, in the event the body portion 76 of the upstream sealing ring 72 is relatively thin and flexible and the downstream movement of the ball 44 is relatively limited, the body portion 76 will be moved sufficiently far downstream to retain the ball-engaging face 80 in sealing engagement with the ball 44 as illustrated in FIG. 5. With this combination, therefore, the upstream sealing ring 72 will remain effective, such that the valve will be provided with both upstream and downstream seals. It may also be noted, however, that with either the operation shown in FIG. 4 or the operation shown in FIG. 5, any excess pressure build-up in the valve body 12 between the upstream and downstream sealing rings 72 and 74 will be effective on the upstream sealing ring 72 to move the ball-engaging surface 80 of the upstream sealing ring away from the ball 44 and provide a bleed-off of this excess pressure back into the upstream side of the valve.

Figure 6:
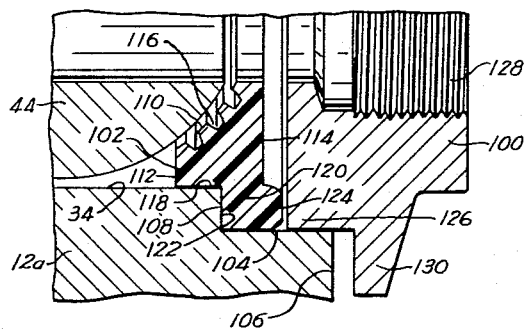
FIG. 6 is an enlarged exploded view of a portion of a slightly modified valve and seal construction.

FIG. 6 illustrates a portion of the downstream end of a slightly modified valve body 12a, modified cooperating connector 100 and a modified sealing ring 102. The modified valve body 12a has the usual valve chamber 34 therein to receive the valve ball 44 and is provided with a counterbore 104 in the downstream end 106 thereof having a length or depth greater than the counterbores previously described in connection with FIGS. 1–5. The counterbore 104 provides a circumferential shoulder 108 in the downstream end of the valve chamber 34 facing the downstream end 106 of the valve body 12a.

The modified sealing ring 102 is formed of a synthetic resin material, as in the sealing rings previously described, and is provided with a shaped or curved ball-engaging surface 110 between the inner and outer ends 112 and 114 thereof. In this instance, however, a plurality of annular grooves 116 are formed in the ball-engaging surface 110 to facilitate the seal provided between the sealing ring 102 ad the ball 44 when the sealing ring is in a sealing position, as will be described. The outer diameter of the sealing ring 102 is substantially equal to the diameter of the valve chamber 34 to provide a sliding fit of the outer periphery 118 of the sealing ring in the valve chamber in the relaxed condition of the sealing ring.

A circumferential flange 120 extends from the outer periphery 118 of the sealing ring 102 into the counterbore 104 and has an outer diameter, in the relaxed condition of the ring, substantially equal to the diameter of the counterbore 104. The inner end 122 of the flange 120 is flat and mates with the circumferential shoulder 108. An annular bead 124 is formed on the outer end of the flange 120 extending from the outer periphery of the flange to a point axially aligned with the walls of the valve chamber 34. That is, the bead 124 has a width corresponding to the radial width of the shoulder 108.

The connector 100 is provided with a cylindrical extension 126 on its inner end having an outer diameter of a size to provide a sliding fit thereof in the body counterbore 104. It will thus be seen that when the extension 126 is inserted in the counterbore 104 and pressed against the bead 124 as the connector 100 is being secured to the downstream end 106 of the valve body 12a, the bead 124 will be deformed into a flange 120 and a substantially equal volume of material will be displaced into the inner peripheral portion of the sealing ring 102 to bias or flex the sealing ring 102 inwardly in the valve chamber 34 and bring the ball-engaging surface 110 into sealing engagement with the ball 44. The connector 100 is provided with a threaded bore 128 therethrough having a diameter substantially equal to the inner diameter of the sealing ring 102 and forming an outlet for the valve. The connector 100 is rigidly secured to the valve body 12a in any suitable manner, such as by bolts (not shown). An outwardly extending flange 130 on the connector 100 is positioned to engage the downstream end 106 of the body 12a and limit the inward movement of the connector 100 as the connector is being secured to the valve body. It will thus be seen that when the connector 100 is secured to the valve body 12a, the shoulder 108, the walls of the counterbore 104, and the inner end of the connector extension 126 form an annular groove opening into the valve chamber 34 and that the flange 120 will completely fill this annular groove to provide an effective seal around the outer periphery of the sealing ring 102. It will also be apparent that the sealing ring 102 will flex axially back and forth to follow the movements of the valve ball 44 in the same manner as the downstream seal 74 previously described. It will be further understood that a valve may be provided with a sealing ring 102 at both its upstream and downstream ends.

Figure 7:
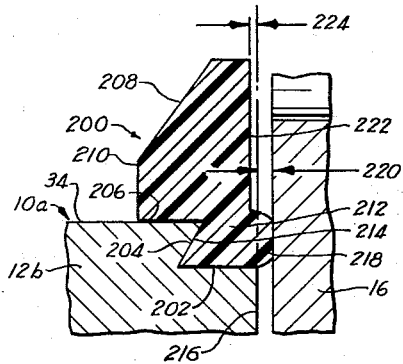
FIG. 7 is an illustration of another seal form.
Figure 8:
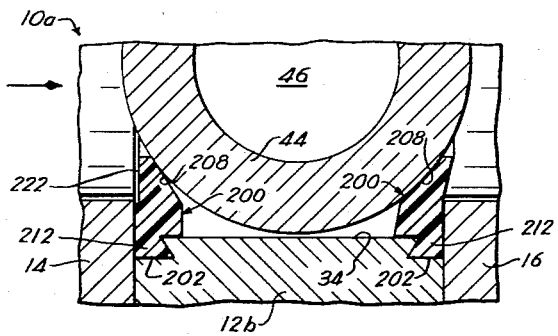
FIG. 8 is an illustration of the use and operation of the FIG. 7 form of seal.

FIGS. 7 and 8 illustrate another modified valve construction 10a. Referring first to FIG. 8, it will be observed that the valve 10a comprises a modified valve body 12b having the usual valve chamber 34 therein to receive the valve ball 44 and is provided with the upstream and downstream connectors 14 and 16 constructed in the same manner as in the valve 10 construction. Identical upstream and downstream sealing rings 200 are secured in the upstream and downstream ends of the valve chamber 34 in the manner most clearly shown in FIG. 7.

As indicated in FIG. 7, each end of the valve body 12b is provided with a counterbore 202 therein concentrically with respect to the valve chamber 34, with the inner end of each counterbore 202 being tapered to provide a circumferential shoulder 204 facing the respective end of the valve body and slanted axially inward from the valve chamber 34.

Each sealing ring 200 is formed of a synthetic resin material in the same manner as in the sealing rings previously described and has an outer periphery 206 sized to slidingly fit in the respective end of the valve chamber 34 in the relaxed condition of the sealing ring. A ball-engaging face 208 is formed between the inner end 210 and the inner periphery of each sealing ring 200. In this form of the invention, the ball-engaging surface 208 is substantially flat, in the relaxed condition of the sealing ring, and extends at approximately a tangent to the outer surface of the valve ball 44. A circumferential flange 212 is formed around the outer periphery of each sealing ring 200 and extends into the respective body counterbore 202. The inner end 214 of each flange 212 is shaped to mate with the corresponding body shoulder 204 and the outer periphery of the flange 212 slidingly fits in the respective counterbore 202 in the relaxed condition of the ring. It will also be noted in FIG. 7 that each flange 212 is of an axial length greater than the depth of the respective counterbore 202 to protrude beyond the respective valve body end face 216. The outer end portion 218 of each flange 212 may be rounded as shown in FIG. 7 and, prior to installation of the adjacent connector 14 or 16, protrudes beyond the respective body end face 216 by predetermined distance as indicated by the arrows 220 in FIG. 7. It will also be noted in FIG. 7 that the outer end 222 of each sealing ring 200, prior to the assembly of the respective connector 14 or 16 to the valve body, is spaced axially inward from the respective body end 216 by a slight distance as indicated by the arrows 224. However, the outer end 222 of each sealing ring 200 is substantially flat, extending transversely with respect to the longitudinal axis through the sealing ring. Therefore, when the respective connector 14 or 16 is secured to the valve body, the connector distorts the outer end portion 218 of the respective sealing ring flange 212 and a volume of the synthetic resin material substantially equal to the protruding end portion 218 of the sealing ring is displaced into that portion of the sealing ring 200 in the valve chamber 34 to bias the sealing ring 200 further into the valve chamber into contact with the ball 44 in the manner illustrated in FIG. 8.

When the valve 10a is assembled as illustrated in FIG. 8, and the ball 44 is centered in the valve chamber 34, an intermediate portion of the ball-engaging surface 208 of each sealing ring 200 is in sealing engagement with the adjacent surface of the ball 44 to provide both upstream and downstream seals which are effective at low pressure. When the valve ball 44 is turned to a closed position and a substantial pressure differential exists across the valve, the ball 44 will be moved downstream in the same manner as previously described in connection with the valve 10. Thus, the downstream sealing ring 200 is flexed downstream into engagement with the downstream connector 16 and the ball-engaging surface 208 of the downstream seal 200 is further distorted to make additional contact with the adjacent surface of the ball 44. As shown in FIG. 8, the inner diameter of the downstream sealing ring 200 may be appreciably less than the inner diameter of the respective tubular connector 16 and the ball 44 may be moved sufficiently far downstream to flex the inner peripheral portion of the downstream sealing ring 200 into the connector 16. However, the downstream sealing ring 200 will remain in sealing engagement with the ball 44 and in sealing engagement with the valve body 12b to provide an effective downstream seal, even under high pressure conditions.

As the valve ball 44 of the modified valve 10a is moved downstream, the upstream sealing ring 200 tends to follow the movement of the valve ball by virtue of the high pressure existing in the upstream end of the valve and active on the outer end 222 of the upstream sealing ring. Thus, under normal valve operations, the upstream sealing ring 200 will remain in sealing engagement with the adjacent surface of the ball 44 in all operating positions of the ball and provide an effective upstream seal for the valve. On the other hand, however, the upstream sealing ring 200 is free to flex back upstream and provide a space between the respective ball-engaging surface 208 and the ball 44 in the event the pressure in the valve chamber 34 exceeds the upstream pressure in the same manner as previously described in connection with the upstream sealing ring 72 in the valve 10.

From the foregoing it will be apparent that the present invention provides a novel ball valve construction utilizing novel seals constructed of synthetic resin material wherein the seals are effective in either high or low pressure service. The biasing of the seals into engagement with the valve ball upon assembly of the valve minimizes the precision required in machining the various metal parts of the valve, and the sealing rings may be one-piece molded structures to provide an economical valve construction. In the event one of the seals is damaged during operation of the valve it may be easily and simply replaced by merely removing the adjacent tubular connector. It will also be apparent that the sealing rings may be constructed to provide both upstream and downstream seals in all operating positions of the valve ball or provide only downstream seals if desired.

Changes may be made in the combination and arrangement of parts or elements as heretofore set forth in the specification and shown in the drawings, it being understood that changes may be made in the embodiments disclosed without departing from the spirit and scope of the invention as defined in the following claims.

What is claimed is:
1. A ball valve, comprising:
   a body having opposite ends, a valve chamber therein between said ends, and a counterbore in one end of the valve chamber communicating with the adjacent end of the body and forming an outwardly facing circumferential shoulder in spaced relation from said adjacent end of the body;
   a valve ball having a port therethrough and mounted in said valve chamber for turning movements between open and closed positions;
   a tubular connector adapted to be secured to said adjacent end of the body having an inner diameter less than the diameter of said counterbore and having a substantially flat inner end positioned axially in alignment with said shoulder; and
   an annular, synthetic resin sealing ring disposed in the valve chamber having an inner end facing in the direction of the ball and an outer end facing in the direction of said connector, said sealing ring having a circumferential flange portion extending radially outward into said counterbore and clamped between said shoulder and the inner end of the connector, said flange portion, in the relaxed condition thereof, having an axial thickness substantially greater than the distance between said shoulder and the inner end of the connector when the connector is secured to said adjacent end of the body and being rounded between the outer periphery thereof and the end thereof facing the connector, whereby said flange will be deformed and the inner peripheral portion of the sealing ring will be biased toward the ball when the connector is secured to said adjacent end of the body.

2. A ball valve as defined in claim 1 wherein the outer periphery of said flange portion is of a uniform diameter substantially corresponding to the diameter of said counterbore in the relaxed condition of the flange.

3. A ball valve as defined in claim 1 wherein the outer end of the sealing ring, from said flange portion to the inner periphery thereof, is substantially flat.

4. A ball valve as defined in claim 1 wherein said flange portion has a radial thickness substantially equal to the radial width of said shoulder and, except for said rounded portion, has an axial length throughout its radial thickness, in its relaxed condition, substantially greater than the distance between said shoulder and the inner end of the connector when the connector is secured to the body.

5. A ball valve, comprising:
   a body having upstream and downstream ends, a valve chamber therein and counterbores in the opposite ends of the valve chamber communicating with the opposite ends of the body and forming outwardly facing circumferential shoulders at the opposite ends of the valve chamber;
   a valve ball having a port therethrough and mounted in said valve chamber for turning movements between open and closed positions;
   a pair of tubular connectors adapted to be secured to the upstream and downstream ends of the body, each of said tubular connectors having an inner diameter less than the diameter of the respective counterbore and a substantially flat inner end; and
   upstream and downstream, annular, synthetic resin sealing rings positioned in said counterbores for sealing the opposite sides of the ball in the body when the valve is closed, each of said sealing rings having an inner peripheral portion extending radially inward of the respective shoulder to engage the ball and an outer diameter substantially conforming to the diameter of the respective counterbore, the axial thickness of that portion of each sealing ring positioned in the respective counterbore, in the relaxed condition thereof, being substantially greater than the distance between the respective shoulder and the inner end of the respective connector when the respective connector is secured to the respective end of the body, and each of said sealing rings being rounded between the outer periphery thereof and the end thereof facing the respective connector, whereby the inner peripheral portion of each sealing ring will be biased toward the ball when the connectors are secured to the body against the sealing rings.

6. A ball valve, comprising:
   a body having upstream and downstream ends, a valve chamber therein and counterbores in the opposite ends of the valve chamber communicating with the opposite ends of the body and forming outwardly facing circumferential shoulders at the opposite ends of the valve chamber;
   a valve ball having a port therethrough and mounted in said valve chamber for turning movements between open and closed positions;
   a pair of tubular connectors adapted to be secured to the upstream and downstream ends of the body, each of said connectors having an inner diameter less than the diameter of the respective counterbore and a substantially flat inner end; and
   upstream and downstream, annular, synthetic resin sealing rings in the opposite ends of the valve chamber, each of said sealing rings having an inner end facing in the direction of the ball, an outer end facing away from the ball and a circumferential flange portion extending radially into the respective counterbore and clamped between the respective shoulder and the inner end of the respective connector, each of said flange portions, in the relaxed condition thereof, having an axial thickness substantially greater than the distance between the respective shoulder and the inner end of the respective connector when the respective connector is secured to the respective end of the body and being rounded between the outer end and outer periphery thereof, whereby said flanges will be deformed and the inner peripheral portions of the sealing rings will be biased toward the ball when the connectors are secured to the upstream and downstream ends of the body.

References Cited

UNITED STATES PATENTS

| | | | |
|---|---|---|---|
| 3,014,690 | 12/1961 | Boteler | 251—171 |
| 3,056,576 | 10/1962 | Kulisek | 251—315 |
| 3,210,042 | 10/1965 | Freeman | 251—309 |
| 3,244,398 | 4/1966 | Scaramucci | 251—358 |

FOREIGN PATENTS

| | | |
|---|---|---|
| 1,018,974 | 10/1952 | France. |
| 843,149 | 8/1960 | Great Britain. |

M. CARY NELSON, *Primary Examiner.*

W. R. CLINE, *Assistant Examiner.*